United States Patent

[11] 3,603,884

[72] Inventors Paul J. Zaura, Jr.
Glen Ellyn;
George C. Hawkins, Hanover Park; Gary A. Cannalte, Hoffman Estates, all of, Ill.

[21] Appl. No. 830,350
[22] Filed June 4, 1969
[45] Patented Sept. 7, 1971
[73] Assignee Motorola, Inc.
Franklin Park, Ill.

[54] SPEECH-NOISE DISCRIMINATING CONSTANT PULSE WIDTH SQUELCH
6 Claims, 1 Drawing Fig.

[52] U.S. Cl. 325/348, 325/478, 325/480
[51] Int. Cl. H04b 1/10
[50] Field of Search 179/1 SW, 1 VC, 1 P, 1 SA, 1 VL; 325/348, 478, 480; 340/148

[56] References Cited
UNITED STATES PATENTS

| | | | |
|---|---|---|---|
| 2,761,897 | 9/1956 | Jones | 179/1 VC |
| 3,056,086 | 9/1962 | Brauner | 325/478 X |
| 3,126,449 | 3/1964 | Shirman | 179/1 P |
| 3,350,650 | 10/1967 | Kemper | 325/480 X |
| 3,390,339 | 6/1968 | Kamerer et al. | 325/478 |

*Primary Examiner*—Benedict V. Safourek
*Attorney*—Mueller and Aichele

ABSTRACT: A squelch circuit for a receiver wherein the detected signals at the discriminator are amplified and converted to pulses of constant period or width. The pulses are detected and used to develop a control voltage to actuate an audio or transmitter switch. A decrease in the noise signal due to the presence of a proper radio frequency signal will decrease the pulse rate, increase the control voltage and actuate the switches allowing the audio signal to pass through the audio stages of the receiver and activating an associated transmitter.

PATENTED SEP 7 1971 3,603,884
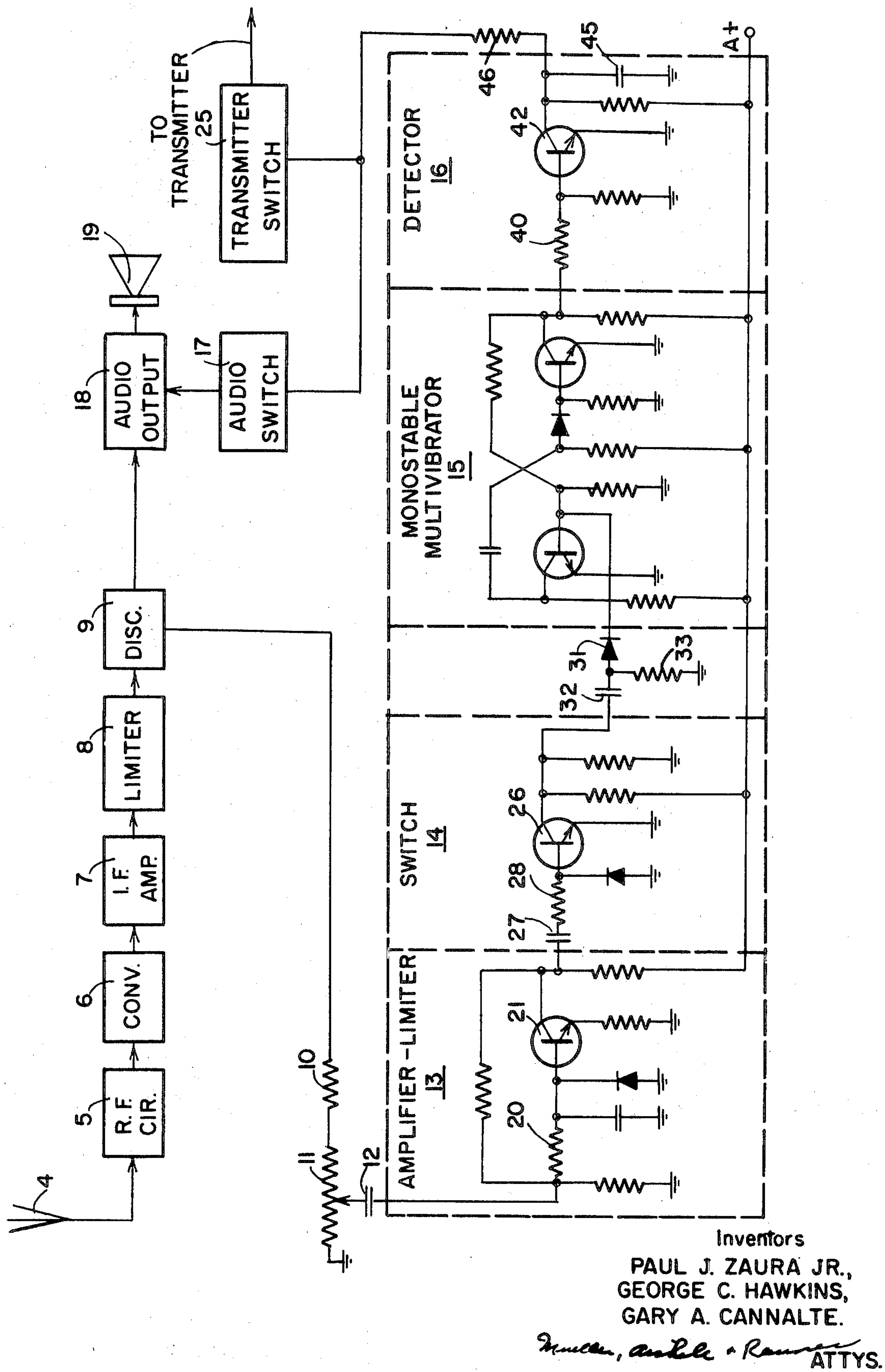
Inventors
PAUL J. ZAURA JR.,
GEORGE C. HAWKINS,
GARY A. CANNALTE.
Mueller, Aichele & Rauner
ATTYS.

SPEECH-NOISE DISCRIMINATING CONSTANT PULSE WIDTH SQUELCH

BACKGROUND OF THE INVENTION

Squelch circuits, responsive to the detected receiver noise at the receiver discriminator, are used in communications receivers to eliminate noise output from the audio section during periods when no signal is received. Squelch circuits have often been used to provide a number of other control and indication functions such as in radio relay systems where they are used to actuate an associated transmitter and allow retransmission of the received signal when the receiver has received a proper signal. A form of squelch circuit more commonly used in communications receivers filters the detected receiver noise to eliminate the audio frequency signals, amplifies the filtered signals and used the amplified signals to actuate a switch which turns the receiver audio section off. When a modulated signal is present the detected noise consists primarily of signals in the audio frequency range and the noise signals outside the audio range are suppressed. The amount of noise outside the audio range is insufficient to actuate the switch, thus allowing the audio circuit of the receiver to operate. This system has been employed to advantage for many years. However, it has the disadvantage that if a very heavily modulated radio frequency signal is present, a high-amplitude detected noise and modulation signal will result at the discriminator. The filter commonly employed in the squelch circuit is not capable of completely attenuating the high amplitude signals in the audio portion of the frequency range. The audio signals not attenuated will be amplified and detected in the squelch circuit and actuate the switch causing the audio section to turn off or causing the associated transmitter to turn off. The phenomenon of changes in amplitude of the detected noise and modulation signal causing the audio to turn off is commonly known as squelch blocking.

When a radio frequency signal is present the detected noise components above the audio frequency rang are suppressed. If the radio frequency carrier is modulated, the detected noise components above the audio frequency range increase somewhat in amplitude. The greater the deviation produced by the modulation, the less the suppression of the detected noise above the audio frequency range. When a radio frequency signal is deviated to the maximum allowable limits, the increase in detected high frequency noise components can be amplified and detected in the squelch circuit causing the audio to turn off or causing an associated transmitter to turn off. This phenomenon of increased amplitude of detected noise components when a radio frequency signal is fully deviated causing the receiver to squelch is commonly known a squelch clamping.

SUMMARY OF THE INVENTION

It is, therefore, an object of this invention to provide an improved squelch circuit for a receiver or radio relay system to substantially reduce blocking.

It is another object of this invention to provide an improved squelch circuit for a receiver or radio relay system to substantially reduce squelch clamping.

In practicing this invention a squelch circuit is provided for coupling detected signals to an audio, transmitter keying, or other control or indicating switch for actuating the same. Detected noise and modulation signals at the receiver discriminator are coupled to the squelch circuit where they are detected and converted to pulses or very short duration. These pulses are then used to actuate a monostable multivibrator which produces a string of constant period pulses. The repetition rate of these pulses is directly related to the frequency of the detected noise and modulated signals. When a radio frequency signal is not present, the detected noise and modulation signals at the receiver discriminator are composed of a mixture of signals in and above the audio frequency range. These detected signals will result in a sufficient number of constant period pulses from the multivibrator to prevent the voltage at the detector from increasing to a level which will actuate the switch. When a radio frequency signal is present, the detected signals at the receiver discriminator will consist primarily of audio frequencies. Audio frequency signals will not produce a sufficient number of constant period pulses to actuate the switch. Large increases in amplitude in the detected signal due to strong audio frequency signals cause no change in the number of pulses produced by the multivibrator so that the squelch circuit is frequency and not amplitude sensitive. The blocking phenomenon cannot therefore occur.

The first stage of the squelch circuit limits in the presence of detected audio signals. Detected noise signals appearing along with the detected audio frequency signals when the radio frequency signal is modulated, are suppressed to a low amplitude by this limiting action of the first stage. The low amplitude is not sufficient to trigger the multivibrator and cause the switch to actuate. Audio turnoff due to increases in noise level with increased modulation level (squelch clamping) is therefore substantially reduced.

The invention is illustrated in the single drawing which is a partial schematic and partial block diagram of the squelch circuit.

DETAILED DESCRIPTION OF THE PREFERRED EMBODIMENT

Referring now to the drawing, the receiver of the invention includes an antenna 4, for applying signals to a radio frequency (RF) circuit 5, which includes frequency selective circuits, and may or may not include amplifying circuits. The selected signal is applied to converter 6, which may include one or more stages of frequency conversion, to provide an intermediate frequency (F) signal. The intermediate frequency signal is amplified in stages indicated at 7, and limited in further stages indicated at 8. The limited intermediate frequency signal is applied to discriminator 9 which may be of known circuit configuration and which is constructed to reproduce the audio modulation signals, and noise signals greater in frequency than the audio modulation signals from the intermediate frequency signal. The output of the discriminator is applied to a loudspeaker 19 or other device for reproducing the modulation signals. The output of discriminator 9 is also applied to the squelch circuit of this invention where it is used to control an audio switch 17, that allows the audio to pass through the audio output section 18 to speaker 19 thereby unsquelching the receiver. Additionally the squelch circuit may be used to control a transmitter switch 25, which turns on an associated transmitter.

When no radio frequency signals are present, the detected noise at the discriminator 9 output consists of signals in and above the audio frequency range. Detected noise and modulation signals from the output of the discriminator 9 are coupled through resistor 10, potentiometer 11 and DC blocking capacitor 12 to amplifier limiter stage 13. Potentiometer 11 allows adjustment of the amplitude of the detected signals coupled from the discriminator to the amplifier limiter 13. The amplitude of the detected signal is directly related to the presence of radio frequency signals. When no radio frequency signals are present, the detected noise signal amplitude is higher than when an unmodulated radio frequency signal is present. Adjustment of the amplitude of detected noise signals applied to the squelch circuit adjusts the sensitivity of the squelch circuit to the presence of signal.

Detected noise signals coupled through resistor 20 to the base of transistor 21 in amplifier limiter 13 are amplified by transistor 21. The signals amplified by transistor 21 in amplifier limiter 13 are coupled from the collector of transistor 21 through capacitor 27 and resistor 28 to the base of transistor 26 in switch 14, which is biased to be normally conductive. Negative-going portions of the signals, in excess of a predetermined amplitude, cause transistor 26 to turn off. A positive-going pulse is developed at the collector of transistor 26, in switch 14 every time transistor 26 is turned off. The positive-going pulses thus developed are differentiated by capacitor 32 and resistor 33 to produce positive and negative pulses of very short duration. The positive pulses are coupled through diode 31 to monostable multivibrator 15. Each pulse will turn the multivibrator on for a constant period of time, producing a constant width pulse which is coupled to the input of detector 16. A series of constant width pulses will therefore be produced at the input to detector 16. With no radio frequency signal present the pulse rate out of monostable multivibrator 15 exceeds 4,000 pulses per second.

The constant width pulses are coupled from monostable multivibrator 15 through resistor 40 to the base of transistor 42 in detector 16. Transistor 42 is normally biased off. The constant width pulses turn transistor 42 on for the period of the pulse. When transistor 42 is turned on, the voltage at the collector of transistor 42 rapidly decreases toward ground potential and capacitor 45 coupled to the collector of transistor 42 discharges through transistor 42. When transistor 42 turns off, the voltage at the collector of transistor 52 increases toward supply voltage, and capacitor 45 begins to charge toward supply voltage.

The voltage developed across capacitor 45 is coupled through resistor 46 to audio switch 17 and transmitter switch 25. With transistor 42 turned on more than 4,000 times a second, capacitor 45 cannot charge to the predetermined voltage sufficient to actuate audio switch 17 or transmitter switch 25. When switch 17 is not actuated, the audio signal cannot pass through the audio output stage 18 of the receiver. The audio output of the receiver therefore remains squelched. When switch 25 is not actuated, the associated transmitter will not key and the received message cannot be retransmitted.

When a radio frequency carrier is present, the detected noise signals at discriminator 9 are substantially reduced in amplitude. A large percentage of these signals when coupled through resistor 10, potentiometer 11 and capacitor 12 and amplified in amplifier limiter stage 13 are not of sufficient amplitude to turn transistor 26 in switch 14 off. This results in substantially fewer constant width pulses from monostable multivibrator 15. The pulse rate from monostable multivibrator 15 is therefore substantially below 4,000 pulses per second.

When the radio frequency carrier is modulated at an audio rate, the detected signals at the receiver discriminator 9 are primarily in the audio frequency range nd the noise components above the audio frequency range are suppressed. As the radio frequency carrier is deviated to the allowable limits by the modulating signal, the detected noise signals above the audio frequency range again begin to increase in amplitude, to a level where they could be detected by the squelch circuit. The amplitude of the detected noise signals is however substantially lower than the amplitude of the detected modulation signals. The detected noise and modulation signals are coupled from discriminator 9 through resistor 10, potentiometer 11 and capacitor 12 to amplifier limiter stage 13. The high amplitude detected modulation signals cause transistor 21 in amplifier limiter stage 13 to limit substantially. The limiting action further suppresses the amplitude of the detected noise signals which are coupled to the base of transistor 21 in amplifier limiter stage 13. Because of the suppression of the detected noise signals in the amplifier limiter 13, the detected modulation signals coupled from the collector of transistor 21 in limiter 13 through capacitor 27 and resistor 28 to the base of transistor 26 in switch 14 are the only signals of sufficient amplitude to turn transistor 26 in switch 14 off. The positive going pulses developed at the collector of transistor 26 when transistor 26 is turned off are differentiated by capacitor 32 and resistor 33, to produce positive and negative pulses of short duration. The positive pulses are coupled through diode 31 to monostable multivibrator 15, triggering the multivibrator and producing a series of constant width pulses at the input to detector 16. The detected modulation signals, consisting primarily of signals in the audio frequency range, will cause less than 4,000 constant width pulses per second to be produced by multivibrator 15. With less than 4,000 pulses per second coupled from multivibrator 15 to detector 16, transistor 42 in detector 16 will remain off often enough to allow capacitor 45 to charge to a voltage in excess of the predetermined value, which will actuate switch 17 and switch 25. The voltage across capacitor 45 is coupled through resistor 46 to audio switch 17 and transmitter switch 25 actuating the switches. This unsquelches the receiver and allows the audio signal to pass through the audio output stages 18 of the receiver to speaker 19 and keys the associated transmitter.

Changes in amplitude of the detected modulation signal cannot actuate the squelch circuit to prevent the audio from passing through the audio output 18 to speaker 19 or turn off the associated transmitter, because the number of pulses generated per second is dependent on the frequency and not amplitude of the detected signals. Changes in deviation of the radio frequency signal within the allowable limits cannot actuate the squelch due to the suppression of noise signals characteristic of amplifier limiter 13 when modulation signals are present.

It can therefore be seen that the above described circuit represents an improved receiver squelch circuit which substantially reduces the problems of squelch clamping and blocking.

We claim:

1. A squelch circuit responsive to detected noise and modulation signals from a receiver discriminator for actuating a switch which responds to a control signal of a predetermined amplitude, and wherein said detected noise signals extend in a frequency range above said modulation signals, said squelch circuit including in combination, first circuit means coupled to said discriminator and adapted to receive the detected noise and modulation signals and responsive to said signals to develop pulses in response thereto having a predetermined constant duration, the number of said pulses varying in accordance with the frequency of said noise and modulation signals coupled thereto, detector means coupled to said first circuit means and responsive to said pulses to develop a control signal having a an amplitude which varies with the repetition rate of said pulses, and means coupling said detector to the switch and applying thereto said control signal to actuate said switch when said control signal exceeds said predetermined amplitude.

2. The squelch circuit of claim 1 wherein said first circuit means includes, input means for receiving the detected noise and modulation signals, second circuit means coupled to said input means and responsive to said signals to develop first pulses therefrom, said second circuit means being operative to produce a number of first pulses varying in accordance with the frequency of said noise and modulation signals coupled thereto, a multivibrator means coupled to said second circuit means and responsive to each of said first pulses to develop a second pulse having a predetermined duration.

3. The squelch circuit of claim 1 wherein said first circuit includes, input means for receiving the detected noise and modulation signals, amplifier limiter means coupled to said input means and responsive to the detected noise and modulation signals to amplify and limit said detected noise and modulation signals, switch means coupled to said amplifier limiter means and responsive to said amplified and limited signals to switch from a first to a second state, differentiation means coupled to said switch means and responsive to said changes in state to produce pulses of short time duration, and second circuit means coupled to said differentiation means and responsive to each pulse to produce a pulse having a predetermined duration.

4. The squelch circuit of claim 3 wherein said second circuit means is a monostable multivibrator.

5. The squelch circuit of claim 4 wherein said detector means includes, semiconductor means coupled to said monostable multivibrator, and capacitor means coupled to said semiconductor means, said semiconductor means being operative in response to said constant duration pulses to control the signal developed across said capacitor means to provide said control signal.

6. The squelch circuit of claim 1 wherein said detect of means includes, semiconductor means coupled to said first circuit means, capacitor means coupled in said semiconductor means, said semiconductor means being operative in response to said constant period pulses to control the signal developed across said capacitor means to provide said control signal.